United States Patent
Snelgrove et al.

(10) Patent No.: US 6,985,722 B1
(45) Date of Patent: Jan. 10, 2006

(54) TELECOMMUNICATION SERVICES

(75) Inventors: William Martin Snelgrove, Toronto (CA); Michael Stumm, Toronto (CA); Mauricio De Simone, Toronto (CA); Bruno R. Preiss, Waterloo (CA)

(73) Assignee: Soma Networks, Inc., (CA)

( * ) Notice: Subject to any disclaimer, the term of this patent is extended or adjusted under 35 U.S.C. 154(b) by 0 days.

(21) Appl. No.: 09/787,759

(22) PCT Filed: Sep. 24, 1999

(86) PCT No.: PCT/CA99/00873

§ 371 (c)(1),
(2), (4) Date: Nov. 6, 2003

(87) PCT Pub. No.: WO00/19735

PCT Pub. Date: Apr. 6, 2000

Related U.S. Application Data

(60) Provisional application No. 60/101,857, filed on Sep. 25, 1998.

(30) Foreign Application Priority Data

Mar. 4, 1999 (CA) .................................. 2264407

(51) Int. Cl.
*H04M 3/00* (2006.01)
(52) U.S. Cl. .................... 455/420; 370/255; 703/17
(58) Field of Classification Search ............ 455/67.11, 455/418, 420, 424, 423, 403; 370/252, 254, 370/255; 703/4, 13, 14, 17; 379/221.07, 379/221.15, 243, 244
See application file for complete search history.

(56) References Cited

U.S. PATENT DOCUMENTS

| 4,399,531 | A | 8/1983 | Grande et al. ............... 370/216 |
| 4,933,936 | A | 6/1990 | Rasmussen et al. ........ 370/406 |
| 4,939,773 | A | 7/1990 | Katz .......................... 379/204 |

(Continued)

FOREIGN PATENT DOCUMENTS

EP   0 448 073 A2   9/1991

(Continued)

OTHER PUBLICATIONS

U.S. Appl. No. 09/721,617, filed Nov. 27, 2000, Preiss.

(Continued)

*Primary Examiner*—Charles N. Appiah
(74) *Attorney, Agent, or Firm*—Katten Muchin Rosenman LLP

(57) ABSTRACT

The present invention relates generally to telecommunications, and more specifically to a method and system of providing telecommunication services that is flexible and efficient. Existing Public Switched Telephone Network systems suffer from a number of problems including system complexity, access being proprietary and services being implemented on fixed hardware. As a result, new services are complex and costly to develop, so telcos only provide services that appeal very broadly. The invention provides an open and flexible system by describing communications in terms of graph packets which contain pointers to blocks of software code, rather than containing large blocks of executable code. In the preferred embodiment, these graphs identify software filters which are dedicated to particular tasks, and are based on a standard API. This allows third parties to create new filters and make them available, allowing new services to be provided quickly and easily.

12 Claims, 8 Drawing Sheets

U.S. PATENT DOCUMENTS

| | | | |
|---|---|---|---|
| 4,974,256 A | 11/1990 | Cyr et al. | 379/113 |
| 5,473,363 A | 12/1995 | Ng et al. | 348/15 |
| 5,481,601 A * | 1/1996 | Nazif et al. | 379/201.03 |
| 5,517,562 A | 5/1996 | McConnell | 379/207 |
| 5,581,610 A | 12/1996 | Hooshiari | 379/133 |
| 5,596,635 A | 1/1997 | Rao | 379/202 |
| 5,603,054 A | 2/1997 | Theimer et al. | 395/826 |
| 5,638,412 A | 6/1997 | Blakeney, II et al. | 375/377 |
| 5,668,854 A | 9/1997 | Minakami et al. | 379/88.18 |
| 5,674,003 A | 10/1997 | Andersen et al. | 709/228 |
| 5,742,772 A | 4/1998 | Sreenan | 395/200.56 |
| 5,774,674 A | 6/1998 | Gutmann et al. | 709/237 |
| 5,793,762 A | 8/1998 | Penners et al. | 370/389 |
| 5,859,979 A | 1/1999 | Tung et al. | 709/228 |
| 5,898,772 A | 4/1999 | Connors et al. | 379/265 |
| 5,926,798 A | 7/1999 | Carter | 705/26 |
| 5,999,563 A | 12/1999 | Polley et al. | 375/222 |
| 6,021,158 A | 2/2000 | Schurr et al. | 375/211 |
| 6,327,551 B1 * | 12/2001 | Peterson et al. | 703/1 |
| 6,907,395 B1 * | 6/2005 | Hunt et al. | 703/21 |

FOREIGN PATENT DOCUMENTS

| | | |
|---|---|---|
| EP | 0 062 669 A1 | 10/1994 |
| EP | 0 680 190 A2 | 11/1995 |
| EP | 0 716 386 | 6/1996 |
| EP | 0 859 500 A2 | 8/1998 |
| FR | 2 658 635 | 2/1991 |
| WO | WO 97/26750 | 7/1997 |
| WO | WO 97/35402 | 9/1997 |
| WO | WO 98/19412 | 5/1998 |
| WO | WO 00/19663 | 4/2000 |
| WO | WO 00/19677 | 4/2000 |
| WO | WO 00/19691 | 4/2000 |
| WO | WO 00/19693 | 4/2000 |
| WO | WO 00/19736 | 4/2000 |

OTHER PUBLICATIONS

U.S. Appl. No. 09/722,003, filed Nov. 27, 2000, Snelgrove.

"Connection Establishment in High-Speed Networks", Scott Jordan and Hong Jiang, IEEE Journal on Selected Areas in Communications, vol. 13, No. 7, Sep. 1995.

"A New Approach to Service Provisioning in ATM Networks", S.H. Low and P.P. Varaiya, IEEE Transactions on Networking, vol. 1, pp, 547-553, 1993.

"Connection Establishment Protocol Based on Mutual Selection by Users and Network Providers", Nagao Ogino, ACM, 1998.

"Challenges for nomadic computing: Mobility management and wireless communications", Thomas F. LaPorta et al., Mobile Networks and Applications 1 (1996), pp. 3-16, 1996.

"A distributed control strategy for wireless ATM networks", M. Veeraraghavan et al, Wireless Networks 1 (1995), pp. 323-339, 1995.

"Control Point Systems Products and Services", Control Point Systems Inc., http://www.controlpoint.org/products.htm, Feb. 10, 1999.

"New Lucent software allows internet telephony providers to offer ubiquitous, seamless telephone service", Lucent Technologies, http://www.lucent.com/press/0998/980917.bla.html, Sep. 17, 1998.

"Enabling th Promis of N xt G n ration Converged Networks", Lucent Technologi s, http://www.lucent.com/IN/softswitch.html, 1999.

"Lucent Technologi s unveils n xt-generation IP business systems that converg voice and data ov r local and wid area networks", Lucent T chnologies, http://www.lucent.com/press/1098/981021.bca.html, Oct. 21, 1998.

"Vendors Raise Voic Over IP", Chuck Moozakis, http://www.internetwk.com/news1098/news102398-3.htm, Oct. 23, 1998.

"An Insurgence of Conv rgenc At N+1", Kim Borg, http://www.westworldproductions.com/archiv /1998/1198ctr/5897.htm, Nov. 1998.

"Distributed Pricing for Embedd d ATM Networks", J. Murphy et al., http://www.eeng.dcu.ie/~murphyj/dist-price.html, Jun. 8, 1995.

"Mobile Service Agents Enabling 'Intelligence On Demand' In Telecommunications", S. Kraus et al., 1996 IEEE Global Telecommunications Conference (Globecom 96), vol. 1, pp. 78-84.

* cited by examiner

TELECOMMUNICATION SERVICES

This application claims the benefit of Provisional Application Ser. No. 60/101,857, filed Sep. 25, 1998.

FIELD OF INVENTION

The present invention relates generally to telecommunications, and more specifically, to a method and system of providing telecommunication services that is flexible and efficient.

BACKGROUND OF THE INVENTION

Telecommunications systems need to process the data flowing through them in complex ways, often with processing occurring on computer systems separated both geographically and administratively. Many communications paths are simultaneously active, and the processing applied to the various flows of data changes frequently and in a wide variety of ways. The software needed to control these computer systems is generally large, complex and difficult to change.

When the data flowing through the system represents voice, such as in a modern digital telephone network, special processing must be applied to implement such features as three-way or multi-way calling, voice-mail, voice recognition and authentication, call waiting, encryption, voice coding and dual-tone multi-frequency (DTMF) detection. For data applications in general, such as electronic mail, remote computing, file transfer between computers or Web browsing, there are needs for security functions such as firewalls and encryption as well as datastream functions such as traffic shaping, error handling, prioritization, caching, format translation and multicast.

While telecommunications systems are already complex, this is a market for new services such as video telephony, Internet games, video on demand, Internet audio, remote collaborative work and telemedicine. These services will need new families of features to be overlaid on the existing network, making the software development task even more complex.

As well, even for a single application, different users may have different needs, for example, requiring different degrees or forms of encryption. This makes the development of communications applications slow due to the complexity of handling many cases.

In addition to their different processing and connectivity requirements, different telecommunications applications have different needs for "quality of service" measures such as delay time, delay variability, and reliability. These requirements ar not presently specified in a flexible manner, though they may vary for different parts of a complex telecommunications application. For example, if a voice-mail system is used to record a voice call between two parties, low delay is important between the human parties but not in the path to the voice mail's storage location.

In addition to specifying the behaviour and quality of service that the application desires from the telecommunications system, optimal use of the telephone system's resources requires it to describe the loads that it will place on that system, for example in terms of bandwidth requirements on communications links and in terms of processing power required in computation nodes. Current systems do not have this capacity.

The complexity of present telecommunications systems software, and the extensive interactions between its software components, makes the development of new features very difficult. As well, telecommunications services have traditionally been provided by large monopolies who employed proprietary equipment that only they had access to. Another complexity is that new services had to be backward compatible to handle their existing clientel.

Software development is therefore limited to a "closed group of trusted developers, which reduces the talent pool available and shuts out developers with new ideas for niche markets.

Traditional telecommunications do not consider differentiation, but only a single service. Therefore, telecommunications providers would not be encouraged to offer varied services at a cost reduction to users, for example, reduced quality of voice telephony on Christmas Day, simply to provide additional connections or reduced cost.

As well, small niche markets have gone completely unserved as the cost of developing and implementing the additional products does not net sufficient profits.

Telephony systems as currently implemented comprise "switches" controlled by large computer programs and interconnected by a variety of means, such as optical fibre and coaxial cables. These systems also include computing means to implement such features as conference calling and voice mail. Telephony features, such as voice mail and call forwarding, are implemented by adding code to the programs running the switches and by adding specialized hardware to the telephony network. The features available to particular users are defined in databases accessed by the switch software, and adding a new type of feature may involve changing these databases together with all of the switch software that uses them, and may also involve purchasing and installing new types of hardware in the network. Specialized software is also used to check the consistency of the features assigned to a particular user, for example, call-waiting and call-forward-on-busy features define different behaviours for the same event, in this example a busy receiver.

Changes to the existing telecommunication networks are therefore very complicated to make. There is a rigid model and the hardware structure is difficult to extend. Therefore, existing telephone companies can not easily offer new features such as high quality voice. As well, existing telephone companies take a long time to bring such features to market.

Users can exercise a small degree of control over their telecommunications by use of software running on their personal computers (PCs). For example, there is currently a Telephony applications programming interface (TAPI) that allows software running on a general-purpose computer to control the switching decisions of a type of switch known as a private branch exchange (PBX). An application programming interface (API) converts a series of comparatively simple and high level functions into the lower level instructions necessary to execute those functions, simplifying control of an operating system. Using Windows™ APIs, for example, a program can open windows, files, and message boxes, as well as perform more complicated tasks, by executing a single instruction. Windows™ has several classes of APIs that deal with telephony, messaging, and other issues.

TAPI consists of a large collection of specialized subroutine calls that allow a user to set up and tear down circuits connecting particular physical devices, including telephone sets and servers for functions such as voice-mail. It also allows the user to define how the system should respond to events such as hangups.

A system known as Parlay™, developed by a consortium of companies, implements a telephony API that can be used to control the central office telephone switches owned by large telephone companies. This is similar in concept to the use of a telephony API to control a PBX, but security concerns are of prime concern because of the number of telephone users who would be inconvenienced by a failure.

Parlay™, TAPI, J-TAPI (a Java version of TAPI) and similar systems permit third parties a degree of control over how telephone switches interconnect end users and specialized equipment such as voice-conferencing servers, but do not allow third parties to add new features such as encryption or voice coding. They are also unable to describe the handling of Internet traffic, and so it is necessary for a distinct system to be used to handle such functions as routing Internet browsing data through computers acting as security firewalls.

Socket mechanisms are widely used to describe connections between applications programs running on operating systems such as UNIX™ and Windows™. It can be used to set up connections between applications programs running on different computers, such that packets of data are passed between them across such networks as an Ethernet or the Internet.

When using a socket to communicate with a process on another computer, the programmer defines one side of a communication but must rely on the administrators of the other computer to have set up the other side. A port number is used by convention to describe the expected functionality of the program.

There is therefore a need for a method and system of providing telecommunication services that are flexible and efficient, and improve upon the problems described above. This design must be provided with consideration for ease of implementation and recognize the pervasiveness of existing infrastructure.

WO 97/36430 to Robart et al. relates to Service Provisioning in Intelligent Networks. Specifically, Robart teaches a "Service Logic Representation" (SLR) which is used to translate a defined telecommunication feature to run on special purpose hardware (an Execution Environment) built by various vendors and which have different interfaces and/or hardware. The SLR is a defined high level description of the telecommunication feature and each vendor's Execution Environment translates the SLR into its own required format or expression.

The problem addressed by Robart is the need to execute predefined telecommunication features for execution on hardware built by different (non-compatible) vendors. As admitted in Robart, this was previously solved by using appropriate cross compilers for each execution environment and the solution of Robart is to define a standard representation for such features and to ensure that each vendor's Execution Environment can interpret the standard representation. In contrast, the present invention teaches a system and method wherein telecommunication connections and/or features are proposed, at call set-up time, by the calling party (user) through a proposed desired communication, which is defined as a proposed graph. The network examines the proposed graph to correct/augment the proposed graph to obtain an executable graph and then transmits the executable graph to the network devices to implement the desired communication.

The problem addressed by the present invention, is to provide for a telecommunication system which allows for the flexible set-up of connections/features which need not be predefined, nor static once established. This is accomplished by the user defining a data structure representation of a proposed connection or feature and submitting the representation of the proposed connection or feature to the network. The network then corrects and/or augments the proposed connection or feature as necessary to obtain an executable representation of the connection or feature and the network distributes this executable representation to the network devices required to implement the connection or feature. The network devices then examine the representation and perform their necessary activities to implement the connection or feature. Any device which does not have the software for a necessary function can obtain that software through the network. Once the connection or feature is established, the network can monitor it and create a new executable representation to address network device failures, network condition changes, etc. and the new executable representation can be transmitted to network devices and executed to adjust a connection or feature.

SUMMARY OF THE INVENTION

It is therefore an object of the invention to provide a method and system of providing telecommunication services that is flexible and open to modification and improves upon the problems described above.

One aspect of the invention is broadly defined as a method of implementing a communication over a telecommunications network comprising the steps of: composing the communication in terms of a graph of software building blocks; and dynamically instantiating the graph of software building blocks at run time.

Another aspect of the invention is defined as a method of implementing an application programming interface (API) for graph-based implementation of telecommunications comprising the steps of: receiving input instructions; and responding to the input instructions by generating a graph describing the desired functionallity of the communication.

Another aspect of the invention is defined as a method of implementing a communication over a telecommunications network, the communication being defined in terms of a graph of software building blocks, the method comprising the steps of: dynamically instantiating the graph of software building blocks at run time.

An additional aspect of the invention is defined as a computer data signal embodied in a carrier wave, the computer data signal comprising a set of machine executable code being executable by a computer to perform the steps of any one of the above methods of the invention.

A further aspect of the invention is defined as a computer readable storage medium storing a set of machine executable code, said set of machine executable code being executable by a computer server to perform the steps of any one of the above methods of the invention.

BRIEF DESCRIPTION OF THE DRAWINGS

These and other features of the invention will become more apparent from the following description in which reference is made to the appended drawings in which.

DESCRIPTION OF THE INVENTION

The invention which improves upon the problems described above is a method of implementing a communication over a telecommunications network by composing the communication in terms of a data structure, in particular a graph, of software building blocks, and then dynamically instantiating the graph of software building blocks at run time. This data structure allows the flexible and efficient processing of signals or data streams in communications systems, computer systems and computer networks.

Figure 1:
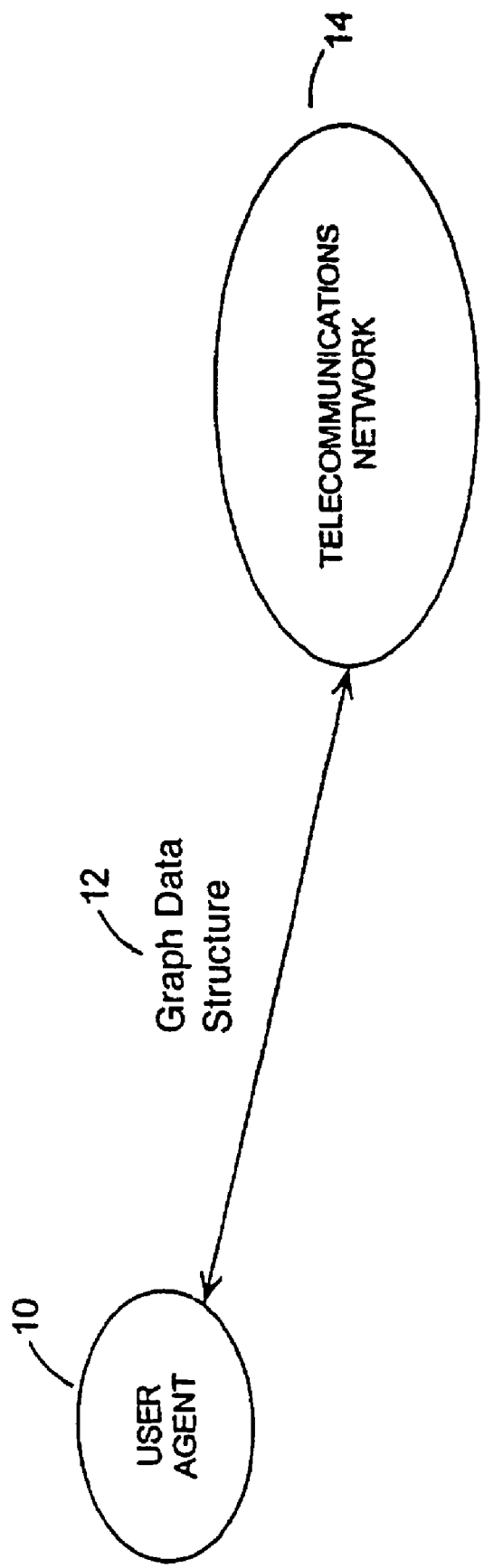
FIG. 1 presents an exemplary schematic diagram of communication over a telecommunications network in a broad embodiment of the invention.

The schematic diagram of FIG. 1 presents a simple example of an implementation of the invention. In this example, a user agent 10 representing a user which desires the communication, generates a data structure 12 which identifies the software building blocks and if necessary, configuration data that it requires to perform the communication. This data structure 12 is transmitted to a telecommunications network 14, which uses this data structure 12 to assemble the software building blocks in the necessary order and to interconnect them as required. If the software building blocks have been given specification configuration details, then the network 14 assigns those configuration details prior to execution of the software building blocks.

This system is very bandwidth efficient, in that large blocks of software code to perform desired functionality are not transmitted around the network 14, but comparatively small data structures 12 that identify the software building blocks to be executed. The software building blocks may be stored in any accessible location, such as locally, at a local cache or server cache, or at a third party location. Third party locations, may, for example, be identified using an Internet universal resource locator (URL) address. This allows third parties to generate new software building blocks and make them available.

The graph data structure 12 identifies functional routines, refered to by the inventors as filter nodes, which are the software building blocks and the graph describes how to link those building blocks together. Therefore, a call is defined in terms of function flow rather than data flow, and the graph data structure 12 may be as simple as a table of pointers to filter nodes, as long as all of the participants know what the contents mean. The graph data structure 12 could be handled by the network 14 as one or more packets.

From the User's perspective, the invention is embodied as an application programming interface (API) which allows the user, or a user agent, to identify desired communication features and parameters, and to generate corresponding graphs. As noted above, an API allows the user, or a user agent, to select functions at a high level while the API generates the corresponding low-level software code.

The network 14 operates such that it receives graph 12 and dynamically instantiates the software building blocks (filter nodes) represented by graph 12 at run time. As will be described with respect to a preferred embodiment, the network 14 is also able to identify and correct certain inconsistencies in the graph it receives.

In the past, only the telecommunications providers were able to provide new functionality to the system, but the open and flexible model of the invention allows any third party to add new filters to the system. All that is required is knowledge of the standard and freely available specification for input and output ports.

As well, the invention provides for a standard API that provides intercompatibility between users, service providers and third parties designing new applications. Third parties may make these new application freely available, or may obtain financial compensation for their use via known electronic commerce techniques.

The invention accommodates new technology and changing market demands and allows for the continuous addition of new services, simply by addition of new filter nodes. Because filter nodes are defined in terms of their properties, coordination and intercompatibilty of filter nodes may be easily administered. In the preferred embodiment, it is a standard part of the graph design philosophy that filters be universal and can be arranged in any order. This is due to the standard input and output rules, strong typing which avoids misconnection of filters, and the graph itself, to call the filters.

In the past, telecommunications systems only provided a very small number of specific services, but today each successive call may require different functionality. Common variations include: requirements for security; quality such as delay, bandwidth and reliability; services such as call forward, call waiting and conference call; and varying requirements for hardware, geography and administration. Implementing all of these features on the existing telecommunications model would require immense quantities of complex code.

While existing telecommunications software must be very complex to allow for such variety in operating modes and user preferences, the invention may, if necessary, handle all of these modes with separate filters. If the variations to a filter are straightforward, they may be included in a single filter node which is configured at time of execution. Alternatively, if the variations are unmanageable, separate filter nodes may be defined. This allows new features to be added quickly and easily.

The configurability of the invention by addition of new filter nodes also addresses problems in the art such as backward compatibility. In the past, older telecommunications switches had to be re-programmed to add new features. To implement the invention with such new switches, one merely designs a new filter node as an interface to the old switch.

Similarly, the openness and flexibility of the invention also overcomes the limitations of existing socket and API design, provides flexibility to change from one transport medium to another, and allows routers and switches to perform load management that was not available in the past.

Most importantly, the accessibility of this system to all interested parties allows the quick progress of new features, exploitation of niche markets that would not have been addressed by telecommunications companies in the past, and does so in a reliable and efficient manner. The expectation is that the invention will commoditize telephony software in a manner similar to how the personal computer commoditized software that had previously been dominated by mainframe computer providers. Rather than requiring man years for telephone companies to develop proprietary software, the invention allows a single user to spend a few hours creating a new filter to the benefit of thousands of users world wide. The invention also provides such freelance software developers to obtain financial compensation for their efforts using existing electronic commerce and milli-commerce techniques.

DETAILED DESCRIPTION OF PREFERRED EMBODIMENTS OF THE INVENTION

As described above, the invention includes a first step of creating a graph composing a communication in terms of a set of software building blocks or filter nodes, and a second step of instantiating that graph at run time.

Figure 2:
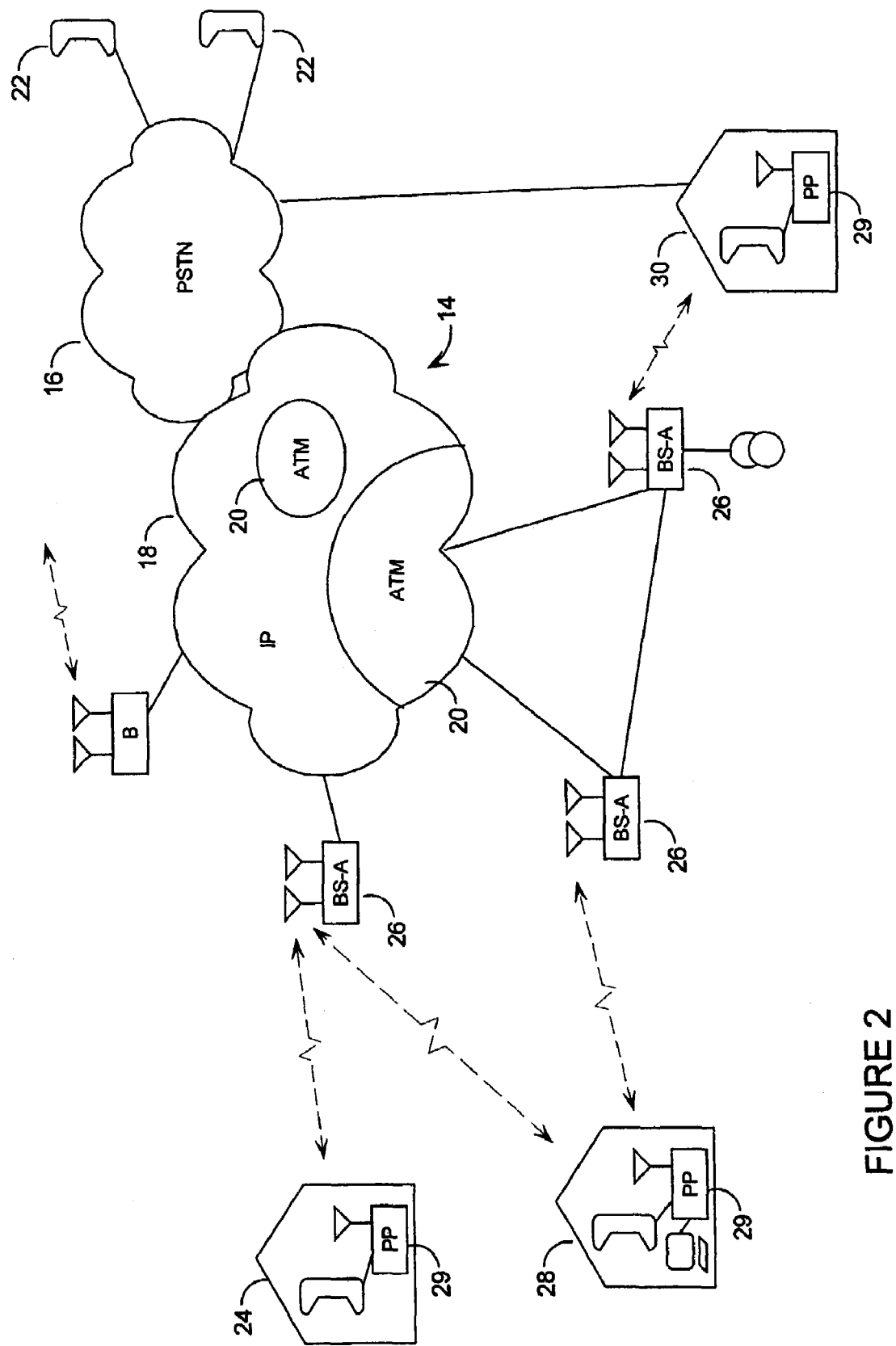
FIG. 2 presents a physical layout of an exemplary telecommunications network in a broad embodiment of the invention.

At a system level, the invention will be applied to a generalized telecommunications network 14 as presented in FIG. 2. In this figure, the telecommunications network 14 is presented as including both a public switched telephone network (PSTN) 16 and Internet 18. Parts of the Internet network 18 is shown to comprise asynchronous transfer mode (ATM) networks 20, but other telecommunication networks are also compatible with the invention including synchronous transfer, integrated services digital network (ISDN), asynchronous digital subscriber line (ADSL), local area networks (LANs), and wide area networks (WANs). Users may connect to this network 14 by use of hard wired telephones 22 or wireless telephones, at locations 24, which connect to the network 14 through base stations 26 of service provider BS-A. Note that these base stations 26 are interconnected via a backbone which may comprise hard wired interconnections, IP or ATM routers as shown, or other similar means.

Similarly computers, at location 28, could access either by wireless, through a base station 26 as shown, or be hard wired to the network 14. Wireless connections of telephones and computers to the network 14 are by means of patchpoints (PP) 29. Redundant illumination, as shown with respect to location 28 is preferred where possible. Also, telephones may have both wireless and hard wire access as shown with respect to location 30.

These arrangements are shown simply as examples, and it would be clear to one skilled in the art that many alternative arrangements are also possible.

A preferred embodiment of the invention will be described firstly with regard to filters and their ports, which will provide a basis for describing the major components of the invention. Those major components will then be described, followed by several implementation examples. Finally, a listing of filters and considerations for their implementation will then be presented.

In a preferred embodiment, the invention will be implemented using a distributed operating system. The software layer of the invention is independent of the hardware layer, allowing filter nodes and other software components to be located anywhere accessible in the system, dynamically mapped onto appropriate hardware, and executed. In some cases, software interfaces may be necessary to allow generalized mapping.

Filters and Ports

Figure 3:
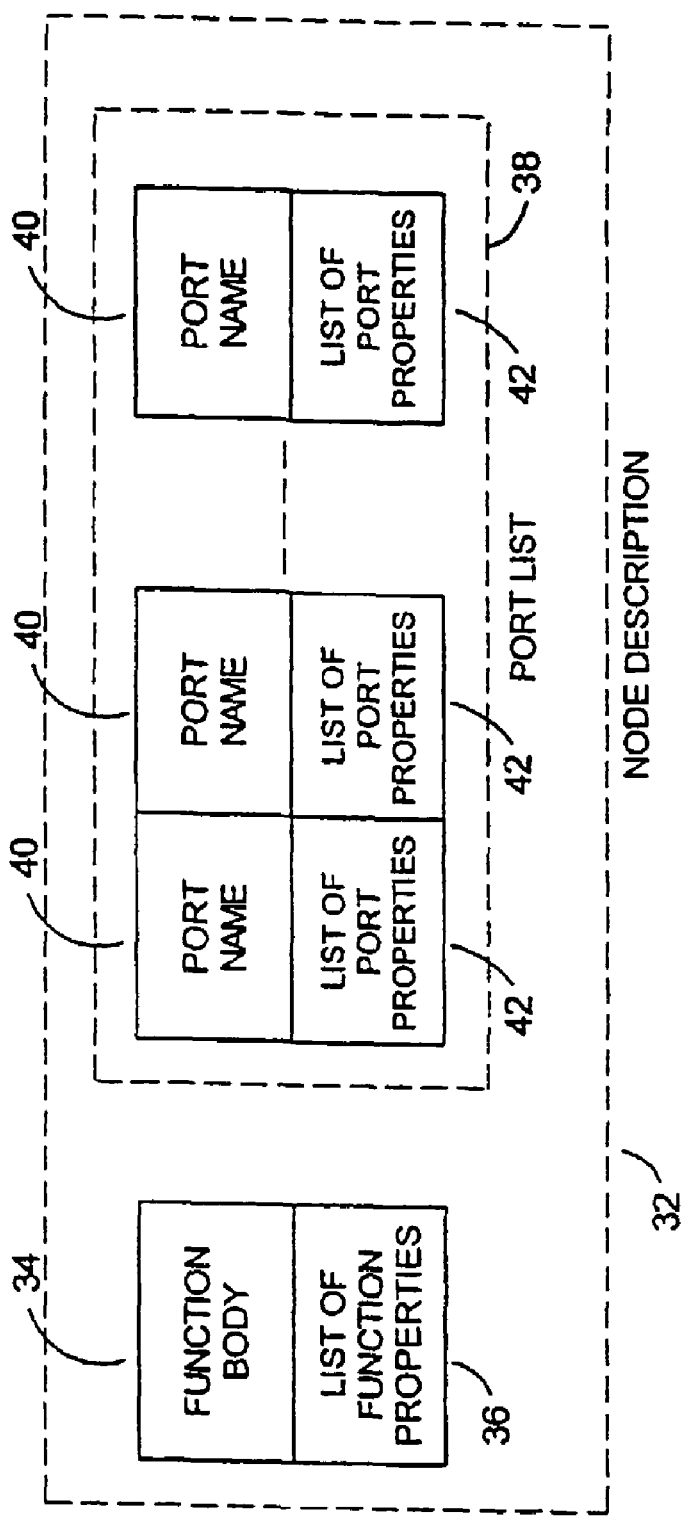
FIG. 3 presents a schematic diagram of a filter node and its components in a preferred embodiment of the invention.

In a preferred embodiment, the architecture of each filter node 32 may be described as shown in FIG. 3. In this embodiment, the function body 34 contains the executable software code, while the list of function properties 36 describes the role of the filter node 32 and does not contain executable code. This list of function properties 36 is used by users to identify the filter nodes 32 they desire, and to derive an understanding of how to apply them.

Each input and output, to or from, a filter node 32 is described as a port 40. Each port 40 in the port list 38 for a given node 32, will have an associated port name and list of port properties 42.

It is preferred that all filter nodes 32 use a standard set of input and output ports 40, so that there is theoretical interconnectability between filter nodes 32. This simplifies the interconnection between ports 40 at run time, speeding up execution. Ports which are not pertinent to the function of a filter node 32 may still have to be processed, possibly to coordinate the timing of the outputs. For example, a given filter node 32 may only be operating on data coming in on half of the ports 40, but the data simply passing through the filter node 32 may have be delayed to maintain the timing integrity of the system.

This arrangement also allows new filter nodes 32 to be designed, which are not backward compatible, by incorporating new ports 40.

Not all filter nodes 32 may be accessed by all parties. Some parties will have administrative authority, while others will have special access packages, and others, basic packages. For example, service providers may have a set of filter nodes which they allow their subscribers to access. As well, service providers may have a set of filter nodes to access long distance providers with which they have special business relationships.

As well, the distinction should be made between subgraphs which represent the interests of the end user, which is typically concerned primarily with the logical structure and only indirectly, through its effects on cost and performance, with the mapping onto hardware, and software that represents the interests of the service provider, which is concerned with sharing hardware resources efficiently among a large number of users. This is a server/client relationship.

Examples of filters nodes 32 are listed hereinafter, but may include:
  interfaces to different transport media such as PSTN, ATM and ADSL;
  interfaces to specific providers of long distance and other services;
  interfaces to specific hardware such as PBXs, traditional telephones and TAPI based equipment;
  various encryption techniques;
  various error correction techniques;
  features such as splitters, mergers and translators; and
  user services such as monitoring quality of service (QoS), time and use.

Ports 40 may have a hierarchical structure. Handshaking or back pressure signals, for example, may be associated with a data stream.

Ports 40 usually have a direction to them (input or output), although they may have components that go in the opposite direction, as for example (again) when a handshake is involved.

Examples of port types can be rationalized from the list of filter nodes 32 hereinafter, but include generally:
  sampled representations of audio signals such as linear, A-law, ADPCM, samples of pre-emphasized signals. Ports of these types are also parametrized by sample rate, number of bits, and the characteristics of pre-emphasis filters;

coded representations of signals such as codebook-excited LPC (linear prediction coder). These can usually be parameterized, for example, by filter length and frame and sample rate;

alerts, which signal the occurrence of an event such as a hang-up or detection of DTMF, and reset ports billing ports, through which representations of money flow;

parameter ports allow call-setup software to adjust such things as sample rates, or to read them;

state input/output ports synchronize complementary pairs of coders and decoders; and IP streams, and compressed versions such as RTP (real time protocol) streams.

Strong Typing of Ports

Ports 40 should preferably be strongly typed" to avoid the setup of meaningless connections between filter nodes 32. For example, a voice coder that expects integer samples of a voice signal will do nothing useful if driven by the output of an FEC coder. This may also require a library of ports 40 to maintain the generalized intercompatibility between filter nodes 32. In a Java implementation, this library of ports 40 could be implemented as different interfaces.

Because the filter nodes 32 in the graph data structure 12 can represent complex computing functions, such as voice coders, only certain interconnections are valid. These nodes have properties such as latency and CPU load, for example, of interest when connecting them together. Because the edges carry different types of information, the filter nodes are best thought of as having typed "ports", such as, in the voice coder case, those for linearly digitized signals and for CELP-coded (codebook excited linear predictive) voice encoding.

As an alternative to strong typing, rules of composition which specify what kinds of networks make sense, could be enforced at the Java level, or enforced by the objects themselves.

Signal Processing Object Software

The Signal Processing Object software is that software that receives the graph data structure 12, instantiates the graph and executes it. In the preferred embodiment, it will be operable to perform the functions of:

1. receiving, instantiating and executing graph data structures 12;
2. management of filter nodes 32 and ports, including analysing, modifying, transparently adding on or choosing filters in response to inconsistencies in the received graph data structures 12. This is not necessary in a basic system, but is desirable for the following reasons:
   a. to add filter nodes 32 to distribute billings to other service providers; or
   b. to correct small incompatibilty errors users may have made in creating graphs. For example, analogue modulated data may be transmitted over an analogue voice channel, but not a digital voice channel as the digitization will destroy the modulated data. The signal processing object will also insert default filter nodes 32 as necessary;
3. continuous or periodic monitoring and evaluating the services and resources available;
4. communication and negotiation with the user agents;
5. consideration for time latencies due to processing and library access;
6. consideration for certification and privileges. Note that privileged and trusted filter nodes 32 are required for billing, OAM&P (Operations, Analysis, Maintenance and Provisioning), NOS (Network Operating System) execution and scheduling. As well, the signal processing object should ensure that such facilities are run on trusted hardware;
7. implement the system provider's pricing algorithm, generally sensitive to availability and loading of resources; and
8. resource estimation for real time. Resource management will identify availability and set resource requirements for CPU average and maximum time available, disk and other hardware resources for drivers, for example;

In the preferred embodiment, the Signal processing object will be written in either C++ or Java, but clearly is not limited to either.

API Software

In the preferred embodiment, the creation of the graph data structure 12 will be implemented using a standard application programming interface (API) which is known by all parties, so that callers may design their requests, and so that third parties may design new products.

As described briefly above, an API converts a series of comparatively simple and high level functions into corresponding lower level instructions necessary to execute those functions. In the preferred embodiment, the API will be operable to:

a. create new filter nodes 32 or modify existing ones using duplication, addition and deletion of filter nodes 32, property lists 42 and ports 40;

b. obtain and analyse existing filter nodes 32 and their properties 42. Editing of nodes will provide the capacity to duplicate and delete. As well, the property lists 42 may be manipulated, new properties 42 created, or new ports 40 enumerated;

c. assemble filter nodes 32 into graph data structures 12;

d. traverse the hierarchy of a graph data structure 12, editing as necessary, and enumerating the graph below a given filter node 32;

c. modifying or inserting new filter nodes 32;

d. simulate filter nodes 32 and graph data structures 12; and e. store default graphs or groups of filter nodes 32.

In the preferred embodiment, the API will be written in C++ or Java, but is not limited to those languages. The preferred language is Java, which is a popular computer language enhanced by features that facilitate loading programs across the Internet and which can enforce strict rules that guard against software viruses that could interfere with the operation of the system to which they are downloaded.

Java is also widely used for programming advanced graphical user interfaces (GUIs) such as those used on some Web pages, and it is preferred that the API of the invention be written on a web-based GUI. This GUI will allow the user to inspect, modify and possibly simulate the parameters of the desired communication simply by identifying and executing icons on his operating screen. This GUI is presented to the User as a web page which may be edited using a standard browser.

The GUI provides a graphical representation on a computer screen of a collection of signal processing and input/output objects. These graphical objects corresponded directly with computer programs resident on a collection of computers specialized for digital signal processing, operating to implement the operations described by the graphical representations. The graphical representations could be interconnected by drawing lines between "ports" on them, which are labelled with names representing their functions such as "encryption" or "error correction".

Figure 4:
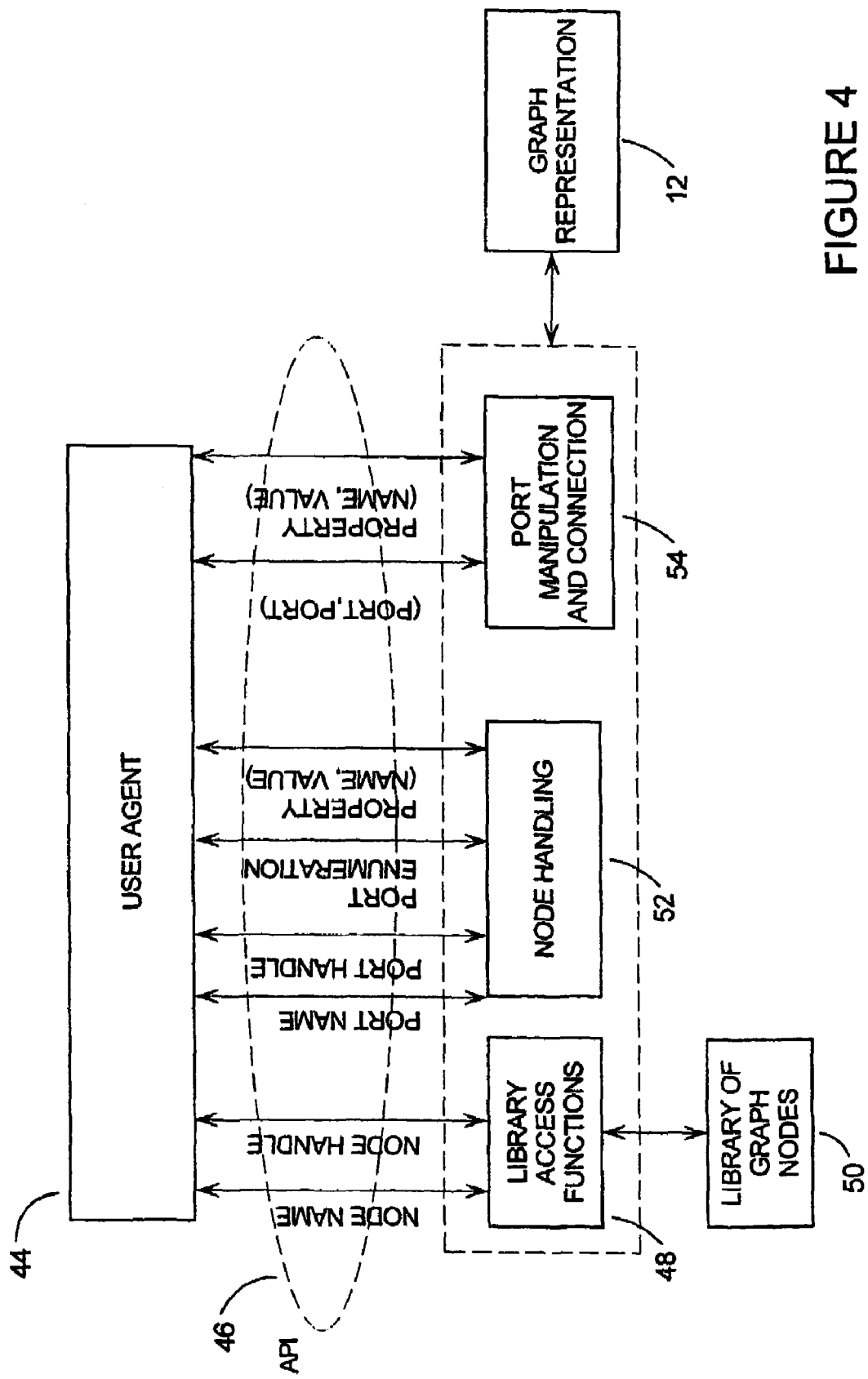
FIG. 4 presents a schematic diagram of an API describing graph creation in an embodiment of the invention.

FIG. 4 presents the functionality of an API in the preferred embodiment of the invention. The user agent 44 allows the user to input high-level instructions to the API 46 via a GUI. These high level instructions will be received by the API 46 and processed to create and transmit graph data structures 12. The processing will generally include the identification of filter nodes 32 which may employ library access functions 48 to obtain data relating to filter nodes 32 from remote libraries 50, but data relating to commonly used filter nodes 32 will be stored at the API 46. The initial API 46 will be supplied to the user with standard filter nodes 32 for basic and commonly used communications modes. If the user has frequent need for more obscure filter nodes, those may be stored on his computer or at a nearby location.

The API 46 also has access to filter node handling routines 52 and port manipulation and connection routines 54 which allow the assembly of graphs, and editing of filter nodes 32 as described above.

Figure 5:
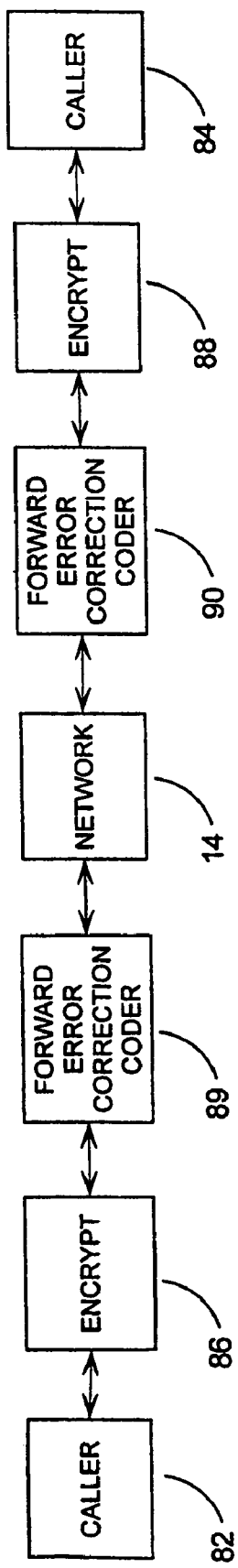
FIG. 5 presents the organization of filter nodes in an exemplary implementation of end to end encryption in an embodiment of the invention.

FIG. 5 presents an implementation of end-to-end encryption without regard for the details of transport over the rest of the network 14 and of the processing required to get low-rate data suitable for encryption. The caller (user) 82 assembles a graph which describes the assembly of filter nodes 32 shown in FIG. 5, by advising the API of the called party 84, and the desire for the communication to have a certain level of security and reliability. The API creates the graph to identify both the caller 82 and called party 84, as well as an encryption/decryption node 86 and the complementary encryption/decryption node 88 at the receiving end of the transmission. From the caller's request for a certain level of reliability, the API selects an error correction strategy and inserts encoder/decoder nodes 89 and 90 into the graph data structure 12.

As noted above, this graph data structure 12 may be prepared without regard for the constraints these filter nodes 32 will put on the available transmission means over the network 14, leaving these issues to be resolved by the Signal Processing Object. When the Signal Processing Object has determined how the graph should be routed, it modifies the graph data structure 12 by inserting filter nodes 32 to route the graph data structure 12 over the desired service providers on the network 14.

This example may be described as a two level hierarchy naturally describing the mapping from physical (less detail) to logical (more detail, because there are several computing task per computer and several logical links per T1) networks.

Not all the information flows in the signal path from one subscriber to another. There are also flows to and from the service provider's billing and management software and to the subscribers' call processing software. For example, if the number of uncorrected errors becomes excessive, it may be appropriate for the encoder to raise an exception in the call processing code so that a more robust one can be chosen. This same example also shows that it can be necessary to modify the graph while it is running.

Hiding the internals of the network 14 as in FIG. 5 is preferred most of the time, but not always. For example, a user may want to be sure that his data is never carried on a certain type of link, one belonging to a competitor, for example, or one for which availability is only statistically estimated or that it travels by two totally independent paths through the network 14 for reliability.

As noted above, it is desirable that some detail be hidden from the end user but not from the server. This would allow private business arrangements to be made between various service providers, encouraging competition and allowing lower rates and more services to be provided to users.

Figure 6:
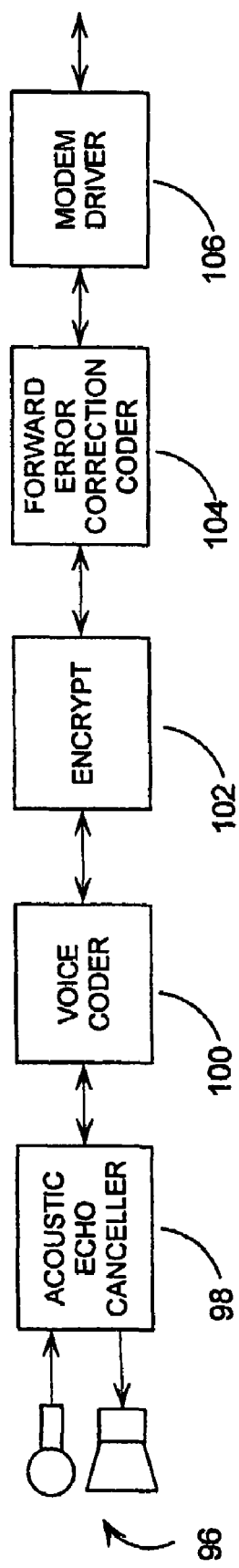
FIG. 6 presents the organization of filter nodes in an exemplary implementation of voice communication in an embodiment of the invention.

An exemplary arrangement of filter nodes 32 for a voice communication over a digital network is presented in FIG. 6. These filter nodes are described in greater detail hereinafter, but this description in given to provide an overview.

Audible communication with the user is performed with the microphone and speaker combination 96, which is usually provided in the form of a combination handset in the case of traditional telephony, or a microphone and speaker set in the case of a personal computer. The audio signals are typically processed by an acoustic echo canceller 98 which attempts to filter and reject audible reverberations.

The signal input by the user is then coded by a voice coder/decoder 100 which digitizes the analogue voice signal coming from the acoustic echo canceller 98. The voice coder/decoder 100 also performs a complementary operation of decoding the digital signal received from the encryption node 102, into an analogue signal which is passed on to the acoustic echo canceller 98.

The voice coder 100 also has a bi-direction communication with the encryption node 102 which encrypts the signal originated by the user, and de-crypts the incoming signal from the forward error correction encoder 104. Forward error correction (FEC) is well known in the art, and is commonly applied in wireless communication. Briefly, it consists of adding codes to a transmitted signal to allow the recipient to detect and correct erroneous data, but at the expense of bandwidth.

The final interface is the modem (modulator/demodulator) driver 106, which modulates the signal onto a carrier frequency for transmission by radio channel, or similar device.

Examples Of Types Of Filters:

Signal Path Filters a. Linear and Adaptive Filters

Classic linear filtering is used to remove DC and 60/120/180 Hz tones from power-line interference and to smooth signals for down sampling. In a digital system the down sampling and filter are usually combined in a more efficient decimation or rate-conversion block. Other applications, standard in audio but rarer in telephony, include tone controls and generation of reverberation. Computation loads for simple filters are very small, on the order of 1–10 multiply-adds per sample (80 kIPS), and are completely predictable. If the processor on which a filter is running crashes and a new filter is restarted, there will be an audible "click" unless state is preserved, and the internal state may vary quite quickly.

The main requirement that filtering places on the system are:

that multiply-adds at the 16–24 bit level be fast; and that overheads for simple algorithms be small.

Adaptive filters tune their coefficients to the particular call in progress. The best-known case in telephony is the echo canceller, such as the echo canceller 98 of FIG. 6, of which variants are designed to cancel acoustic echoes resulting from an acoustic path from the handset's loudspeaker to its microphone, and electrical echoes resulting from system components, particularly the "hybrid" that converts from 2-wire to 4-wire. An echo canceller is typically a transversal filter with a few hundred taps multiply-adds, supervised by code that tries to determine the appropriate order and to turn it off when it appears to be unwanted or diverging.

Echo cancellers that attempt to deal with acoustic echo from a speaker phone in an office environment need thousands of taps and sophisticated update algorithms, and are still evolving. There are two types of state in an adaptive filter: current coefficient values and signals. Coefficients could be check pointed from time to time, but it is more expensive with signals because they vary more rapidly.

b. Companding techniques use "compression" algorithms that try to adjust gains (smoothly) so as to keep a signal's level more constant and "expansion" algorithms that adjust gains to exaggerate signal-level variations. Some techniques used in audio are frequency-dependent, such as Dolby companding which adjusts filter cutoffs to suppress background hiss when signal levels are low. An extreme example of expansion is "squelch" in which signals with power level below a certain threshold are turned off completely to minimize idling noise. In telephony the most common variant is "echo suppression" as opposed to "cancellation" described above, in which the signal path from the quieter user has its gain reduced. This reduces the loop gain for echoing and feedback oscillation. Companders use around 5–50 operations per sample to implement this technique.

Instantaneous companders work on a sample-by-sample basis. The common A-law case is covered under "coders" below.

Echo suppressors cause trouble for modems, so such filters follow the convention of identifying a 2100 Hz tone at the beginning of a call as an instruction from a modem to disable echo suppression.

c. A 3-way combiner receives three input voice signals and produces three outputs. In principle user C receives voice signal A+B, user B receives voice signal A+C, and user A receives voice signal B+C. The same concept can easily be applied to N-way combining. Companding as described above may also be used to improve subjective quality by suppressing noise from inactive channels.

If stereo speakers are available at a user's location, which is the current trend for personal computer sound (PC), multiple party calls may be processed in stereo at the PC so that each party is given a different physical location in the stereo sound output. This allows the various voices to be more easily distinguished. This filter would be located at the end-user's PC, but would also require that the received packets arrive in a timely fashion and be in a decodable form.

d. Voice coders, such as the voice coder 100 of FIG. 6, are used to reduce the bandwidth requirements for voice signals. There are many types but broadly they can act on the waveform, minimizing some mathematical measure like error power. They can model the source or they can model what the ear will notice. Coding for compression is an active research area, and the invention allows for a steady stream of new coders to appear.

"Telephony classic" uses waveform coding in the form of 8 kHz A-law (or $\mu$-law). Sampling is done at 8 kHz on a signal filtered to pass the range from 300 Hz to 3300 Hz. The passband was defined to get good subjective scores on speech quality and intelligibility, and the sample rate is designed with a 33% margin over the Nyquist minimum in a trade-off between network and pre-filter costs. A-law and $\mu$-law are specialized 8-bit floating-point representations, chosen as a way to get roughly constant signal-to-noise over a wide range of signal levels. By comparison, compact disk (CD) sound is stereo 16-bit fixed-point sampled at 44.1 kHz, requiring roughly 24 times the bandwidth, which requires a T1 level connection. Because speech varies slowly from sample to sample, the same quality can be had for roughly half the bandwidth with adaptive delta pulse code modulation (ADPCM) which, roughly speaking, digitizes the derivative instead.

Most digital cellular telephones use a variant of linear prediction coding, which attempts to model the incoming sound in terms of a sound source that simulates the vocal cords or airflow and which in turn drives a filter that models the larynx. This requires less bandwidth than waveform coding because the larynx moves more slowly than the waveform, but works badly for anything other than speech or even for speech in a noisy environment. These "source coders" are an active topic of research and currently produce tolerable speech at output rates anywhere from 4 kb/s up. A typical modern coder uses about 50 MIPs of DSP capacity. Coders typically operate on 20 msec frames of data, and hence add at least that much delay to the signal path.

Source coders typically try to detect silence, and avoiding the transmission of silence typically saves about 50% of bandwidth on average. At the decoding side it is conventional to replace silence with "comfort noise" so that the listeners know the connection is still live.

Source coding is hard to use for music, because it would be necessary to model a large number of different instruments alone and in combination, so early digital audio such as CD and DAT, just used waveform coding with enough bandwidth and dynamic range to satisfy the human ear. Minidisc and digital compact cassettes brought in coding that reduced CD bandwidth by a factor of about 10 by using psychoacoustics. In particular, masking effects, where loud tones mask nearby ones for normal ears, and bandwidth can be saved by not transmitting the inaudible components. This type of technique can also be rate-adapted, as applied to RealAudio, and is a good candidate for high-quality speech in networks of the invention.

Conventional filters and companders will not work on a coded signal, so it is standard to decompress before filtering. In some cases this might be avoided though; for example, N-way combining can take advantage of silence to do companding at no cost to bandwidth, and only needs to decode and recode while two or more parties are talking simultaneously.

e. Motion Picture Experts Group (MPEG) coders do the same type of thing for video signals that perceptual coders do for music. Components of a video stream at high spatial frequencies are digitized at low resolution, using 8*8 discrete cosine transforms to do the filtering, and "motion estimation" is used so that components of an image that can be derived from adjacent frames are not retransmitted. Actual MPEG processing will be performed at the end-user's PC, because it is very demanding and because specialized hardware exists for it. However, it is desirable that the invention is able to handle its traffic properties.

Straight digitized television (TV) distribution requires roughly 30 frames/sec×200 kpixels/frame×3 colours×8 bits/colour, for 144 Mb/s. That is beyond what third generation (3G) wireless is designed to handle, but MPEG2 gives similar quality at 2 Mb/s, hence the 3G requirement for that rate. However, MPEG2 is bursty, needing more capacity when the image changes suddenly.

At the low-quality end, video conferencing is usually done at 128 kb/s. At this rate the coding process adds hundreds of msec of delay and the picture is poor.

If full-motion video is demanded, then 5 MHz slots will not have sufficient capacity, though 20 MHz slots and generous use of antenna diversity could support 10–40 users at that rate.

f. Voice-mail and its video and text equivalents are usually thought of as pure data, but should be seen as objects with methods for reading and writing, or as filters that persist after calls complete. Generalizing allows different types of coders, including encryption and faK data, to be used in a flexible manner with voice-mail.

g. Reading voice-mail can be thought of as accepting a call, though a time-shifted one. Voice-mails are all pending requests to a proxy representing the called party, and display the graph of the call that set them up even though it has long since been torn down, so that the accepting party can see data type, coding and encryption needs, source of call, check who is paying, and other parameters.

A single-use proxy stays alive and attached to the mail, into which a user may also call to retrieve mail. This permits group messaging or retrieval by password, situations in which the voice-mail does not know who to contact. In this sense reading voice-mail can be thought of as originating a call.

Channel Coding Filters:

a. Forward Error Correction (FEC), such as that performed by the forward error correction encoder 104 in FIG. 6, uses mathematical algorithms such as XOR convolutions between the data and a given sequence to produce redundant bits that can be used to detect and correct errors in transmission. For security of wireless implementations, this will be important. Automatic Repeat reQuest (ARQ) schemes like transmission control protocol (TCP) are simple and efficient and can be arbitrarily reliable, but add variable latency, making them impractical for voice. In telephony, frames which can not be corrected using FEC are discarded, and a reasonable rate of data loss is considered acceptable. There are also trade-offs with respect to redundancy, power and error rate.

The brute-force, and rarely used, example of FEC is triple redundancy, in which every bit is transmitted three times, and the Hadamard codes used in memory systems are also fairly straightforward. The algorithms used in cellular telephony typically have efficiency rates of 50%, half the bits being actual data, and are subtle to derive but easily implemented in hardware. The operations involved are generally at the bit level, so field programmable gate array (FPGA) techniques would be convenient for these algorithms, but the trade-off with software complexity should be considered. Open FPGA assignment would require that third parties can write very high level development language (VHDL) code. Therefore, it is preferred to compromise on openness and apply just enough of the open philosophy to make design simple and systematic, but not allowing complete re-programming of the FPGA.

The current Internet "dumb network" philosophy would suggest the use of end-to-end error correction, but that is inefficient when a particular link is known to be unreliable. If the inefficiency is just that one packet in a thousand is carried a few extra T1 hops the loss is not that significant, but FEC also increases packet size, typically doubling it.

b. Interleaving involves distributing the bits that are protected by one FEC word over several packets, so that even if one packet is badly corrupted, referred to as a "burst error", no single FEC word will suffer more errors than it can correct. The compromise fr voice is that interleaving adds substantially to latency. These computations are also easily implemented in the open software philosophy of the invention, but again so bit-oriented that a hardware solution is convenient and useful.

c. Encryption is needed over wireless channels for security, and may also be desirable end-to-end. Digital cellular systems do a mediocre job of encryption over the air, and immediately convert to cleartext at the base station 26 on the assumption that customers trust the telephone company and so as to make the signals compatible with the rest of the telephone system. An application of such an encryption filter is presented as filter 102 in FIG. 6.

Encryption is the subject of a lot of research and growing commercial interest, so the invention may accommodate a steady stream of new software. The computational loads of some of the more exotic encryption systems are fairly heavy, though triple data encryption standard (DES), standard in the banking industry, is not too unmanageable, requiring a couple of dozen bit-shuffles and O(100) 4-bit table lookups.

Internet traffic will best be encoded in the user's PC rather than at patch points 29, to minimize the amount of cleartext running around. Still, if the invention is being used to implement a virtual private network the users may be transmitting cleartext around their Ethernets and using the invention to bridge remote Ethernets, in which case encryption should be performed at the patch points to provide a secure solution.

It is also preferred to use good encryption, including signature techniques, on wireless control links.

Modem Filters

As shown in the system diagram of FIG. 2, users are intended to have a data connection to the network 14, though they may also have a PSTN RJ-11 connection, as shown at location 30. For Internet use, the data (Ethernet) connection would be faster, though for fax use, the implementation might be simplified by use of the PSTN RJ-11 connection. A PSTN landline could be simulated over the data network 14 to accommodate a fax connection, perhaps using adaptive delta pulse code modulation (ADPCM), or even straight pulse code modulation (PCM), but a voice coder would have to be avoided as it would destroy the data.

A preferred solution is to detect that the data source is a fax, and to implement a fax modem in software at the patch point 29 and at the gateway closest to the receiver so that only the raw fax data need be transmitted. This can be used to economize on latency as well as on bandwidth, but requires that the fax at the receiving end can be "spoofed" by the local modem. An exemplary modem application is presented in FIG. 6 by means of modem filter 106.

IP fax is seen in the industry as a desirable feature, because the volume of fax traffic currently rivals that of voice traffic.

Voice Mail Filters

Current telephony practise for voice-mail is to convert calls to high-rate PCM, transmit the converted voice messages to a point near to intended recipient at high bandwidth and with the usual telephony low latency, then voice-code them to save space and store them on disk.

Network load can be reduced by leaving calls coded as for the wireless link, and by accepting long latencies for coded packets, for example, using best-effort service. This also allows the encrypted voice data to be left encrypted in transit and storage. Disk space may be used wherever it is available, though it is best to move it in advance close to the most likely place from which it will be read because latency is less tolerated when listening to voice-mail.

Integration of a user's various mailboxes including e-mail, voice-mail and fax, is a current industry trend and is a desirable utility for the invention.

Signal and Control Filters a. Dual tone multi-frequency (DTMF) signalling is the familiar "touch-tone" technique of simultaneously transmitting a pair of tones each at one of four frequencies to signal switches for dialling and end-user equipment for voice-mail. The DTMF encoders can be implemented with a simple filter or a table look-up arrangement, and the DTMF receivers can be implemented with a group of filters and slicers at roughly 30–100 operations/sample.

b. Pulse dialling detection involves counting strings of open-circuits on the telephone line at about 10 Hz. The "flash" or "link" buttons often used to signal the desire to set up a 3-way call, basically dial "1".

Both the pulse dialling and DTMF filters described above provide inputs to call processing software from the signal path. That path does not have tight latency requirements, unless the user wishes to suppress the DTMF signal in the path to a called party.

c. Voice recognition can be used to replace dialling and to offer more sophisticated call control from a conventional telephone, or to do authentication. Computational loads can be quite large, larger than voice coding, for example, which is typically a component of voice recognition, and the area is still subject to active research. Computational loads can also vary widely as a function of the input data.

Ideally, voice-operated services can be speaker-independent, but systems that can handle large vocabularies generally have to be trained for the speaker. As well, voice authentication systems require training of the receiving filter. The need for speaker-dependent state suggests that these algorithms will need access to a library, which they may also want to update if they are capable of continual retraining.

The heavy loads, the use of disk resources, and the fact that voice coding is typically the first step combine to suggest that a typical voice recognition application would do voice coding on the patch point 29 but might do the rest of the numerical processing on a computer server at the base station 26 side. The optimal voice coder for voice recognition is not necessarily the optimal or standard one for wireless, so choosing to use voice recognition somewhere in a call graph may constrain the type of voice coder used elsewhere. The call setup agent could just ship both kinds of data, but that would be an expensive use of the wireless resource.

d. Call progress tones like dial-tone and ring and busy signals give call-processing software a way to drive the signal path. Modern systems also allow the use of speech clips, though these are of questionable utility in multilingual environments. A language preference may be designated as part of a user's state.

Users who have a good display device available may prefer to use it rather than to hear ringing tones. This is an interesting example of the need to be able to abstract part of call processing. It is preferred to be able to "plug in" arbitrary ways of notifying the end user that a line is busy without changing the rest of a piece of call processing software. This would also allow easy customizing of audible signals, such as the use of a Beethoven sound bite, rather than a traditional single tone announcement.

IP Packet and Ethernet Port Filters

It is preferred to be able to filter IP packets that come in from the Ethernet port, too. There is not necessarily any warning that IP packets are coming, since IP is connectionless, but that just means that IP filtering is set up by default.

a. IP classifiers assign different types of traffic different priorities, taking a single input, unclassified IP, and producing multiple output streams. Packets should be classified before they are transmitted over the expensive (in terms of the limited bandwidth available, which is shared between users) wireless link so as to implement the user's own policies on what to pay premium rates for. A default classifier may, for example, assign a lower priority to Web traffic than to IP telephony, or give one particular Ethernet source higher priority than others. Classifiers belong at the network input and perhaps also at both ends of the wireless link.

IP classifiers can also manage traffic in the other direction, regulating flows onto the Ethernet from the patch point 29.

b. Traffic shaping, traffic policing and radio resource management go together for IP packets. Traffic shaping typically uses a leaky bucket strategy to force traffic statistics to match the profile promised in a quality of service (QoS) negotiation.

A "leaky bucket" is a technique used in ATM and RSVP to specify average bandwidth. Traffic is modelled in terms of the average output rate and the size of the input buffer needed to smooth bursts out to that rate. A long burst will overflow the bucket, and packets that overflow the bucket are typically marked as candidates for deletion if the network overloads.

For the wireless link these parameters might be interpreted literally, allocating enough radio slots/channels to handle the rate, and putting a buffer at the sending side. For an optical link it may be interpreted only as a specification that defines which packets may be marked for sacrifice. A variant mechanism is a "token bucket" that allows bursts at full speed until the flow has used up a bucket full of tokens, then restricts flow rate to the required average as tokens dribble in. These mechanisms directly express queuing behaviour, which is fundamental to networking, so they are the preferred ones to use.

"QoS Negotiation" refers to a negotiation of desired or required connection parameters. Briefly, a calling party creates a graph including a desired QoS and proposed pricing, and transmits it to the service provider for consideration. The service provider may accept the proposal, issue a counter proposal, or abandon the negotiation.

For new services, one cannot assume that there is a single pipe at a given bandwidth and quality of service (QoS) involved in a call. For example, a 3-way video-conference call might have one of the branches operating as voice-only at a much lower rate than the video branches. The API for negotiation has to capture the whole structure of the call. For this reason, and to avoid adding new constructs, the call-graph itself is used as the key specification both of desired service and billing method.

Essentially, the call-manager software hands a "schematic" of the desired call to the RFQ (request for quote) server, which looks at the "traffic cops" and similar blocks to determine a price, then sets parameters in "teller" blocks that feed money into key components. The modified graph is then returned to the call-manager for approval.

For use as part of the RFQ process, the calling graph needs to be able to express anything of interest to the user or the network, including latency, frame error rate, and nature of warranties. These things are expressed by including policing blocks in the call graph that enforce or test for compliance. The policing blocks are trusted, by use of certification or similar techniques.

Traffic policing uses a similar rationale to traffic shaping, when done by trusted code at the input to a network. A standard "traffic cop" filter may be installed as part of any IP path to advise parties when a negotiated QoS has not been met. This is an example of a parameterizable filter, with cell rates and bucket sizes as parameters.

Because IP flows can be very bursty, new radio channels/slots may be needed when a queue starts to build up, then released when the queue empties. In the absence of traffic, when its queue has been empty for a length of time comparable to a channel setup delay, for example, a stream may be assigned to a collision-detect radio channel. The channels are radio resources, and management policies are needed to share them efficiently among data flows, including flows among unrelated but nearby base stations 26 and patch points 29.

c. Header compression is used to avoid repetitively sending 40 byte IP headers over the radio channel. Real time protocol (RTP) is one standard, and circuit switching can be regarded as an extreme case of header compression, where source and destination addresses are known at channel setup.

Compression techniques are particularly sensitive to state, if the decompression filter at the other end of the link crashes and restarts with old state, traffic may be permanently misdirected. There are three philosophies for dealing with this:

i) checkpointing critical state information:
ii) adding a global "reset" signal that is passed to all filters after a crash recovery and which would cause resynchronization; and
iii) adding a private "restart" signal between the compression and decompression filter.

Figure 7:
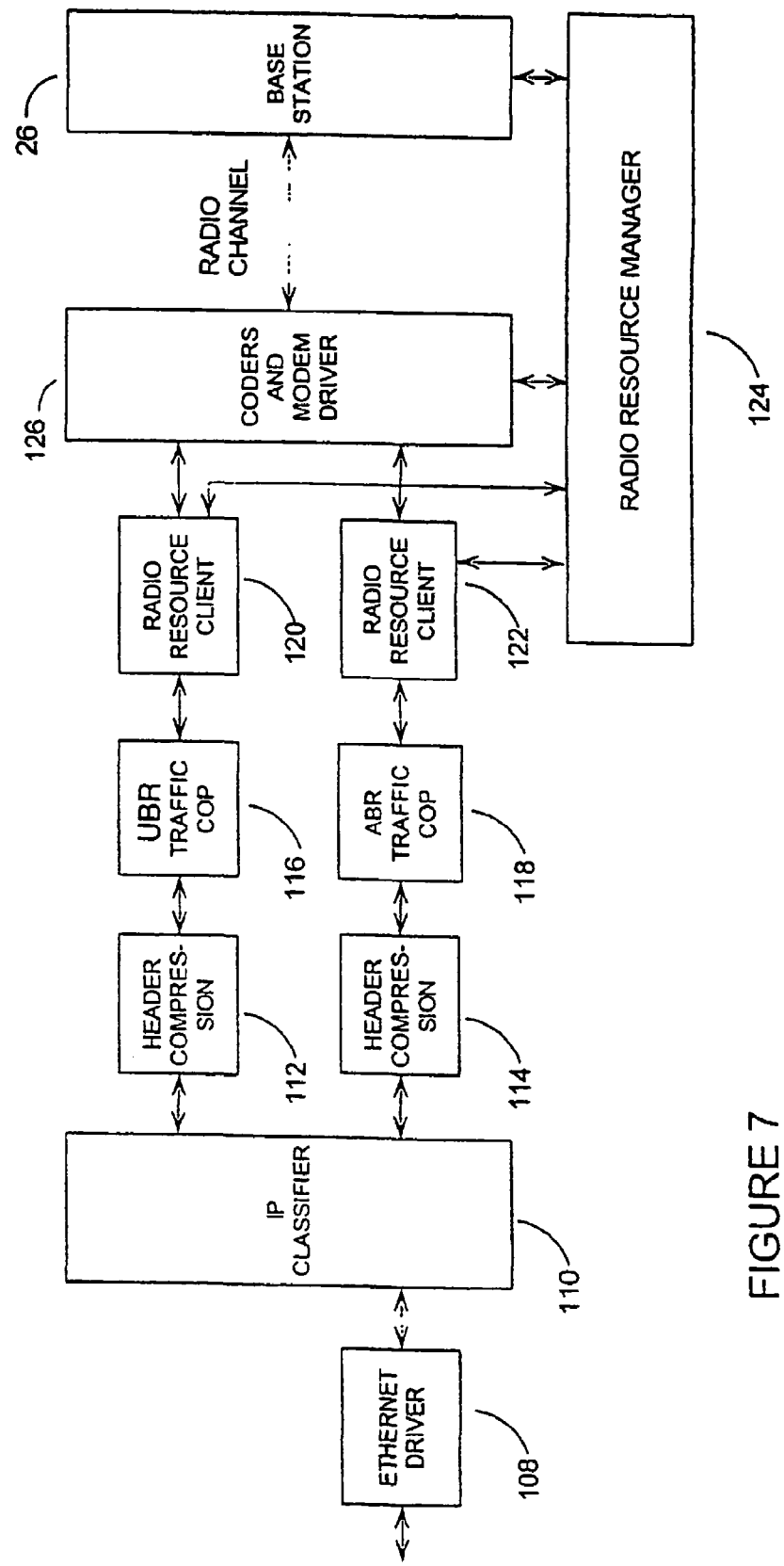
FIG. 7 presents the organization of filter nodes in an exemplary implementation of wireless IP communication in a preferred embodiment of the invention.

FIG. 7 presents an example of wireless IP communication graph applying the filter nodes 32 described above. The Ethernet driver 108 will receive the data signal arriving on the Ethernet port and pass a corresponding data stream to the IP classifier 110. As described above, the IP classifier 110 assigns the incoming data to different priorities appropriate to the incoming data.

In this example, the graph is shown to utilize two ATM transport media: UBR (unspecified bit rate) and ABR (available bit rate). UBR is basically best-effort and models the current Internet service, while ABR specifies a minimum cell rate (MCR) as well as a peak rate, and the network uses back-pressure to control the flow. Therefore, UBR may be acceptable for Internet browsing, while ABR would be preferred for voice telephony, though users would expect to pay a higher rate for use of the ABR service.

Once classified, the IP classifier 110 passes the data to the appropriate header compression node 112, 114 which operates as described above. Separate filter nodes 32 are shown for the UBR and ABR data paths, though a single filter could be used to implement both. As explained above, this would increase the level of complexity in the filter node 32 design, and is not generally desirable.

The graph then describes the addition of traffic cops 116, 118 to monitor the flow of data during the transmission, and to ensure that the user is obtaining the data transfer rates he has been promised during his negotiation. Separate radio resource clients 120, 122 are then attached to the graph data structure 12 to coordinate access to the wireless resources with the global radio resource manager 124. When access is available, data is passed to the coder and modem driver 126 for transmission to the base station 26.

Passing state between compression/decompression pairs of filters is a problem in general, not just for crash recovery, because state information may have to be passed at a higher level of reliability than the rest of the data. This suggests that there should be a "side channel" set up between pairs, as shown in FIG. 8.

Figure 8:
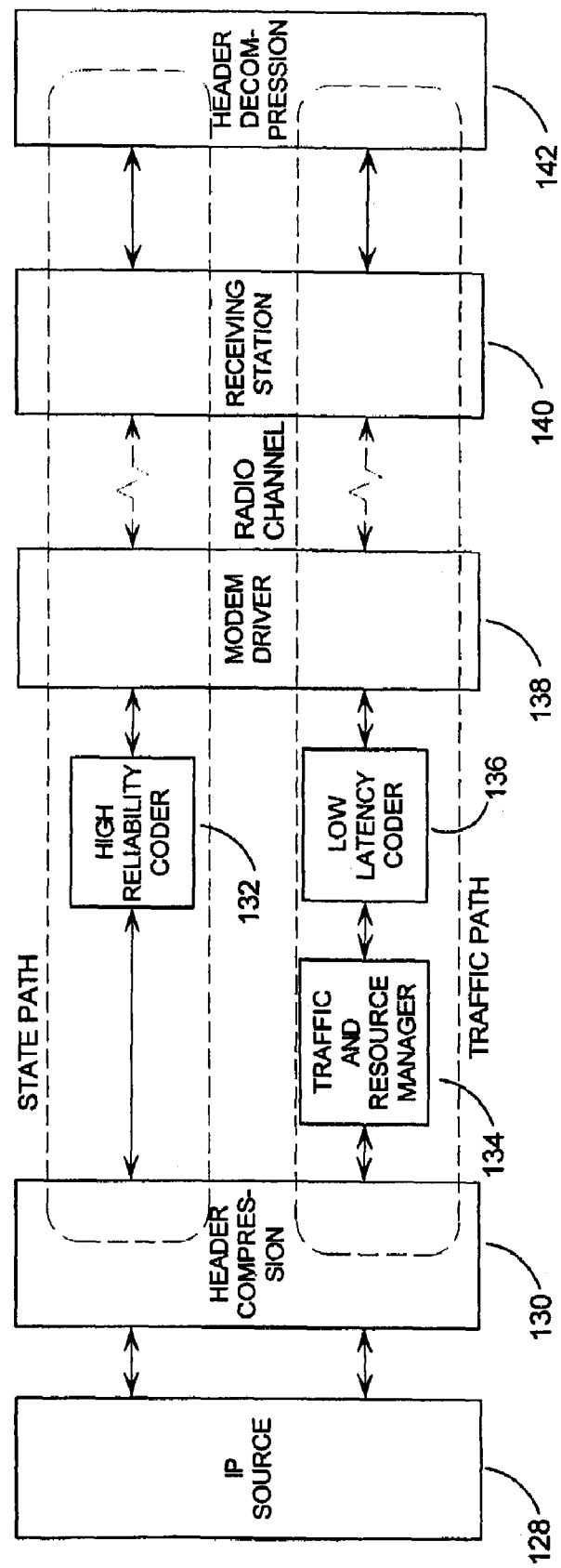
FIG. 8 presents the organization of filter nodes in an exemplary implementation of separate state and traffic sidepaths in a preferred embodiment of the invention.

In FIG. 8, a graph design is presented which employs separate paths for state data and traffic data. The header of incoming data received from an IP source 128 is compressed by the header compression node 130, which transmits the state and traffic separately. The more critical state data is transmitted via a high reliability coder 132, while the less critical traffic data may pass through a traffic and resource manager 134 and low latency coder 136. Both forms of data may then be handled by the same modem driver 138 and transmitted over a wireless channel to a receiving station 140 of some form, which may be a base station 26 or similar network entity. Ultimately, the transmitted data will be decoded by a header decompression node 142 which handles the dual paths originally transmitted.

This arrangement allows a small amount of traffic data to be lost in favour of maintaining low latency, without losing state data. Such an arrangement would be desirable, for example, for voice communication.

d. Firewalls implement security policies that control information flows between the inside and outside worlds, for example by forbidding telnet sessions and allowing only authorized logins from outside. Other firewalls may performing logging and auditing functions, providing summaries to the administrator about what kinds and amount of traffic passed through it and how many attempts there were to break into it.

e. Gateways convert IP traffic to and from other forms, for example to PSTN voice traffic. Base stations 26 with PSTN interface cards can serve as gateways, or third-party gateways may be used by adapting to their protocols.

f. Caching of Web pages is a useful method of controlling bandwidth, but can be very tricky to implement because some Web pages are dynamic. In the case of the IBM/Kasparov chess match for example, large volumes of traffic were generated for pages that changed on a timescale of minutes. In this cases, an Internet service provider (ISP) could implement a cache to reduce the traffic onto the backbone while speeding up response for subscribers. A cache shares information between users, without having to communicate back to the original data source, so its use does not necessarily show up directly in a user's call-graph. It logically fits as part of a gateway to the Internet backbone.

There are currently unresolved issues including:
i) legal issues, such as whether caching violates copyright;
ii) technical issues, such as whether caching makes cookie-based pages malfuncton; and
iii) business issues such as whether it makes advertising banners and referrals miscount.

Implementation of caching has clear performance gains but application should give consideration to these issues.

g. Packet formatting and assembly of data for transmission over ATM and other transport protocols. There are presently a number of such transport media with specifications generally known in the art. Design of packet formatting filters conforming to the protocol of the particular transport medium would be within the skill of one in the art, in view of the teachings of the invention.

i. Interfacing with "socket" mechanisms such as H.323. As noted above, H.323 is widely used to describe connections between applications programs running on operating systems such as UNIX and Windows. It can be used to set up connections between applications programs running on different computers, such that packets of data are passed between them across such networks as an Ethernet or the Internet. In Java, for example, the expression new Socket("www.wireless-sys.com", 8888) returns an object that represents a connection to "port 8888" on a computer on the Internet whose name is "www.wireless-sys.com". This object can be used with other Java methods to send data to, and receive data from, this computer. The "port number" is used by convention to define the type of data expected.

When using a socket to communicate with a process on another computer, the programmer defines one side of a communication but must rely on the administrators of the other computer to have set up the other side. The port number is used by convention to describe the functionality of the program expected.

Sockets typically use the Internet Protocol (IP) and can further be set up to use either the "unreliable datagram protocol", UDP, which sends packets without checking to see if they have been received, or the Transport Control Protocol (check), TCP, which will retry until it receives a confirmation of receipt. Telephony applications typically use UDP, because data that does not arrive on time is of no use, while file transfer programs typically use TCP so that accurate delivery is assured. The user is generally required to choose between these two mechanisms to specify handling of error conditions in packet delivery or to write a completely new mechanism. Just as for telephony, it is difficult to add encryption or signal processing features to the handling of an IP stream.

Links Between the Signal Path and OAM&P

In order to manage the telecommunications network, a service provider will use the facilities of an operations, analysis, maintenance and provisioning (OAM&P) system. Such systems exchange information with network elements using the simple network management protocol (SNMP). In the preferred embodiment, various filter nodes 32 in a graph interact with OAM&P systems using SNMP so that the service provider is able to monitor the performance of the network and manage network resources.

Filter nodes monitor the quality of service delivered to a user by tracking events such as packet queue overflow and packet loss. Filter nodes would maintain statistics on the occurrence of such events and would report said statistics to the OAM&P system using SNMP Filter nodes that perform signal processing algorithms such as compression and voice coding may fail to perform as required, for example, due to the presence of background noise. Such failures would be reported to the OAM&P system using SNMP.

Resources such as CPU time, memory, and link bandwidth, are generally resolved when the filter graph is mapped onto the hardware. However, resources shortages can still manifest after mapping. For example, a user can exhaust the available recording capacity of a voice-mail system by depositing a very long message. Such resource shortages would be reported to the OAM&P system using SNMP.

Links Between the Signal Path and Billing

As noted with respect to FIG. 2, the intent is to provide a generalized solution which may communicate over varied network media including wireless, Internet, and PSTN. Such a generalized solution would therefore have to provide a manner of addressing billing for costs to utilize various network services. Filters 32 would therefore be proposed in the manner of the invention for:

1. PSTN and other transmission service including long distance providers, wireless;
2. mailbox rentals;
3. CPU time;
4. 900 numbers; and
5. electronic commerce.

The Link Description Object

In the preferred embodiment, the connections between the filter nodes 32 in a graph can be described in terms of links containing the name of a source node, and of a port of the source node, and of a destination node, and of a port of the destination node. The list of link properties describes the characteristics of the connection between the filters.

Links usually have a direction to them (from source to destination), although they may also provide for bi-directional information flows, as for example when a handshake is involved.

Examples of the characteristics of links can be rationalized from the port types of filter nodes 32, but may include:

1. A link may represent a physical connection in a generalized telecommunications network. Similarly, the connection between a wireless base-station and wireless telephones or computers are physical connections. Alternatively, a link may represent a logical connection between filters. Said logical connection may be realized using different physical connections available in the telecommunications network. Furthermore the properties of virtual links are changed to reflect the properties of the physical links in a telecommunications network when the graph is mapped onto hardware.
2. A link may reflect the characteristics of the service provided by the telecommunications service provider. These characteristics may include available network bandwidth and quality of service parameters such as delay, reliability, error rate, or packet loss probability.
3. A link may reflect the characteristics of the service desired by the us r. These characteristics may include required network bandwidth and quality of service parameters such as delay, reliability, error rate, or packet loss probability.
4. A link may reflect the characteristics of the service to which that the proxies for the user and the service provider have agreed. These characteristics may include allocated network bandwidth and quality of service parameters such as delay, error rate, or packet loss probability.
5. A link may reflect the physical delay in the signaling medium (e.g., wire, fibre, wireless). It may additionally reflect the queueing delay experienced by a packet that has been routed through the link.
6. A link may include costing parameters or a costing formula by which the service provider can obtain a quote for the total cost associated with the filter graph.
7. A link may be annotated with parameters that specify the billing mechanisms to be used.
8. A link may be annotated with information necessary to interact with an OAM&P system using SNMP.

While particular embodiments of the present invention have been shown and described, it is clear that changes and modifications may be made to such embodiments without departing from the true scope and spirit of the invention, as defined by the attached claims. For example, one could implement the invention without a distributed operating system, by hard-coding the locations of the filter nodes into any graph structures and still realize many of the benefits of the invention.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium such a computer diskette, CD-Rom, Random Access Memory (RAM), Read Only Memory (ROM) or similar computer software storage media as known in the art, may be programmed to execute such method steps. Further, electronic signals representing these method steps may also be transmitted via a communication network such as the Internet.

It would also be clear to one skilled in the art that this invention need not be limited to the existing scope of computers and computer systems. Any telecommunication system could employ broad aspects of the invention including radio systems, television broadcasting, satellite communications, bank automated tellers, point of sale computers, local area networks and wide area networks. A point of sale computer, for example, may run almost all the time in a certain mode, but be accessed remotely to download sales data or update pricing. Again, such implementations would be clear to one skilled in the art, and do not take away from the invention.

Finally, numerous modifications, variations, and adaptations may be made to the particular embodiments of the invention described above without departing from the scope of the invention, as defined by the attached claims.

What is claimed is:

1. A method of implementing a communication over a telecommunication network, comprising the steps of:
    (i) initiating a request for a desired communication, the request identifying desired parameters and features for the desired communication;
    (ii) determining and constructing a proposed graph representing a proposed selection and arrangement of available filters and connections required to implement the desired communication;
    (iii) transmitting the proposed graph to the telecommunication network, the network analyzing the proposed graph to:
        (a) correct inconsistencies and/or detected errors in the proposed graph; and
        (b) determine and add any additional filters and/or connections required to implement the desired communication on the network to obtain an executable graph;
    (iv) transmitting the executable graph to the hardware of the telecommunication network required to implement the desired communication;
    (v) each hardware device of the telecommunication network that receives the executable graph determining from the executable graph which filters the device is required to implement and how those filters are to be interconnected in the device and to the network; and
    (vi) each device of the telecommunication network executing the respective filters and connections to implement the desired communication.

2. The method of claim 1 wherein the additional filters can include filters to perform billing functions.

3. The method of claim 1 wherein the additional filters can include filters to perform routing functions.

4. The method of claim 1 wherein, while the desired communication is implemented, the telecommunication network alters the executable graph and steps (iv) through (vi) are re-performed to modify the desired communication.

5. The method of claim 1 wherein a filter required by a device in the telecommunication network is transferred to the device through the telecommunication network.

6. The method of claim 1 wherein at least one filter in the executable graph operates to test for compliance of the communication with a desired parameter identified in step (i).

7. The method of claim 1 wherein at least one filter in the executable graph operates to ensure compliance of the communication with a desired parameter identified in step (i).

8. The method of claim 1 wherein step (iii) further comprises the step (c) of determining an appropriate cost for the communication.

9. The method of claim 1 wherein the telecommunication network includes portions using different protocols and step (iii)(b) includes the step of considering the protocols employed on connections to produce the executable graph.

10. The method of claim 1 wherein step (i) is performed by a user interacting with a GUI to create the request for a communication.

11. The method of claim 1 wherein one of the filters comprises a conference bridge and the desired communication comprises a multi-party conference call.

12. The method of claim 1 wherein the executable graph includes more than one path and a classifier filter directs data to a suitable path selected from the available paths based on a defined criteria.

* * * * *